(12) United States Patent
Heyl (10) Patent No.: US 11,098,935 B2
(45) Date of Patent: Aug. 24, 2021

(54) METHOD FOR OPERATING AN AIR-CONDITIONING SYSTEM OF A MOTOR VEHICLE

(71) Applicant: Hanon Systems, Daejeon (KR)

(72) Inventor: Peter Heyl, Cologne (DE)

(73) Assignee: Hanon Systems, Daejeon (KR)

( * ) Notice: Subject to any disclaimer, the term of this patent is extended or adjusted under 35 U.S.C. 154(b) by 302 days.

(21) Appl. No.: 16/027,557

(22) Filed: Jul. 5, 2018

(65) Prior Publication Data

US 2019/0011155 A1   Jan. 10, 2019

(30) Foreign Application Priority Data

Jul. 10, 2017   (DE) ..................... 10 2017 115 381.0
Jun. 20, 2018   (DE) ..................... 10 2018 114 762.7

(51) Int. Cl.
*F25B 41/40*   (2021.01)
*F25B 9/00*   (2006.01)
(Continued)

(52) U.S. Cl.
CPC ......... *F25B 41/40* (2021.01); *B60H 1/00885* (2013.01); *B60H 1/00899* (2013.01);
(Continued)

(58) Field of Classification Search
CPC ........ F25B 41/003; F25B 5/02; F25B 25/005; F25B 2309/061; F25B 2339/047;
(Continued)

(56) References Cited

U.S. PATENT DOCUMENTS 3,888,084 A * 6/1975 Hawkins ............... F01K 23/065
60/614
5,549,153 A * 8/1996 Baruschke .............. B60L 58/26
165/42
(Continued)

FOREIGN PATENT DOCUMENTS

JP   2004085176 A   3/2004
JP   2010001013 A   1/2010
(Continued)

*Primary Examiner* — Jianying C Atkisson
*Assistant Examiner* — Miguel A Diaz
(74) *Attorney, Agent, or Firm* — Norton Rose Fulbright US LLP; James R. Crawford (57) ABSTRACT

A method for operating an air-conditioning system of a motor vehicle, wherein the air-conditioning system comprises a refrigerant circulation and a water circulation which are thermally coupled with one another across a condenser/gas cooler. Water circulation flows through the condenser/gas cooler at a low volumetric rate of flow and a high temperature difference so the water circulation transfers heat in the heating heat exchanger to the air in a similar temperature range. Refrigerant circulation cools from 65° C. to 70° C. to −10° C. to +30° C. and water circulation raises to a temperature of 55° C. to 65° C. and that an adaptation of the temperature profile of the water circulation to the temperature profile of the refrigerant circulation takes place in the condenser/gas cooler utilizing a temperature glide of the refrigerant. The refrigerant is significantly cooled.

18 Claims, 5 Drawing Sheets

(51) Int. Cl.

| | | |
|---|---|---|
| *B60H 1/00* | (2006.01) | |
| *B60H 1/32* | (2006.01) | |
| *F25B 49/02* | (2006.01) | |
| *F25B 29/00* | (2006.01) | |
| *F25B 25/00* | (2006.01) | |
| *C09K 5/04* | (2006.01) | |
| *F25B 13/00* | (2006.01) | |
| *C09K 5/10* | (2006.01) | |
| *F25B 5/02* | (2006.01) | |

(52) U.S. Cl.
CPC ......... *B60H 1/32284* (2019.05); *C09K 5/041* (2013.01); *C09K 5/045* (2013.01); *C09K 5/10* (2013.01); *F25B 9/008* (2013.01); *F25B 13/00* (2013.01); *F25B 49/02* (2013.01); *B60H 2001/00928* (2013.01); *C09K 2205/106* (2013.01); *C09K 2205/126* (2013.01); *C09K 2205/24* (2013.01); *F25B 5/02* (2013.01); *F25B 25/005* (2013.01); *F25B 29/003* (2013.01); *F25B 2309/061* (2013.01); *F25B 2339/047* (2013.01); *F25B 2400/121* (2013.01); *F25B 2600/0253* (2013.01); *F25B 2600/13* (2013.01); *F25B 2700/2106* (2013.01); *F25B 2700/2117* (2013.01); *F25B 2700/21161* (2013.01)

(58) Field of Classification Search
CPC ............ B60H 1/32284; B60H 1/32281; B60H 2001/00928
See application file for complete search history.

(56) References Cited

U.S. PATENT DOCUMENTS

| | | | | |
|---|---|---|---|---|
| 6,347,528 B1* | 2/2002 | Iritani | ............... | B60L 3/0046 62/324.6 |
| 10,302,335 B2* | 5/2019 | Kim | ............... | F02C 6/18 |
| 10,589,594 B2* | 3/2020 | Heyl | ............... | B60L 1/003 |
| 2004/0069012 A1* | 4/2004 | Inoue | ............... | B60H 1/02 62/500 |
| 2006/0080985 A1* | 4/2006 | Inaba | ............... | B60H 1/00907 62/238.6 |
| 2009/0205350 A1* | 8/2009 | Takahashi | ............... | F25B 41/00 62/238.6 |
| 2009/0314462 A1* | 12/2009 | Yahia | ............... | B60H 1/08 165/44 |
| 2012/0125032 A1* | 5/2012 | Graaf | ............... | B60H 1/00278 62/318 |
| 2012/0318000 A1* | 12/2012 | Schroeder | ............... | B60H 1/0073 62/56 |
| 2013/0031922 A1* | 2/2013 | Heyl | ............... | B60H 1/00907 62/222 |
| 2013/0206382 A1* | 8/2013 | Ichishi | ............... | B60N 2/5692 165/203 |
| 2014/0020415 A1* | 1/2014 | Heyl | ............... | F25B 13/00 62/119 |
| 2014/0075966 A1* | 3/2014 | Schmitz | ............... | B60H 1/00921 62/56 |
| 2014/0075972 A1* | 3/2014 | Heyl | ............... | B60H 1/00899 62/115 |
| 2014/0138049 A1* | 5/2014 | Schroeder | ............... | B60H 1/00921 165/63 |
| 2015/0121922 A1* | 5/2015 | Chang | ............... | B60H 1/00907 62/126 |
| 2016/0076821 A1* | 3/2016 | Kopko | ............... | F25B 7/00 165/10 |
| 2016/0109163 A1* | 4/2016 | Enomoto | ............... | F25B 13/00 62/160 |
| 2016/0153343 A1* | 6/2016 | Kakehashi | ............... | B60H 1/00885 123/41.31 |
| 2016/0187036 A1* | 6/2016 | Lee | ............... | F25B 30/02 62/98 |
| 2016/0209097 A1* | 7/2016 | Choueifati | ............... | F25B 49/025 |
| 2016/0339761 A1* | 11/2016 | Enomoto | ............... | B60H 1/00278 |
| 2017/0174038 A1* | 6/2017 | Scheldel | ............... | B60H 1/32284 |
| 2017/0182864 A1* | 6/2017 | Heyl | ............... | B60H 1/00907 |
| 2017/0191704 A1* | 7/2017 | Kim | ............... | F01K 13/02 |
| 2017/0219253 A1* | 8/2017 | Vaisman | ............... | F25B 41/00 |
| 2018/0097266 A1* | 4/2018 | Jalilevand | ............... | B60H 1/3211 |
| 2018/0135914 A1* | 5/2018 | Kim | ............... | F28C 3/04 |
| 2018/0272835 A1* | 9/2018 | Fujii | ............... | B60H 1/00285 |
| 2019/0011155 A1* | 1/2019 | Heyl | ............... | B60H 1/00899 |
| 2019/0128575 A1* | 5/2019 | Sugimura | ............... | F25B 43/00 |
| 2020/0039323 A1* | 2/2020 | He | ............... | F25B 5/04 |

FOREIGN PATENT DOCUMENTS

| | | |
|---|---|---|
| JP | 2015131597 A | 7/2015 |
| WO | 2014136447 A1 | 9/2014 |

\* cited by examiner

METHOD FOR OPERATING AN AIR-CONDITIONING SYSTEM OF A MOTOR VEHICLE

This application claims priority from German Patent Application Nos. 10 2017 115 381.0 filed Jul. 10, 2017 and 10 2018 114 762.7 filed Jun. 20, 2018, which is hereby incorporated by reference in their entireties.

The invention relates to a method for operating an air-conditioning system of a motor vehicle. By air-conditioning system within the broader sense is understood a mechanism that conditions the air in the passenger compartment of a motor vehicle. Consequently, in the air-conditioning system the air is heated or cooled and the air humidity is optionally also adapted.

An air-conditioning system according to the invention is adapted in the narrower sense to future motor vehicle applications, specifically vehicles with electromotive or electrochemical drive, and comprises particular heating systems. This is of special significance since the heat management in modern motor vehicles with such drives differs in comparison to conventional motor vehicles with internal combustion engines to the extent that in the case of modern drives, as a rule, exhaust heat for heating the passenger compartment is not available at the high temperature level of the exhaust heat of internal combustion engines. Consequently, within the scope of the invention, refrigerant circulations as heat pumps are comprised as components or [fluid] circuit variants of the air-conditioning systems within the scope of the invention.

In air-conditioning systems of the future, moreover, in the refrigerant circulations refrigerants such as R1234yf or R744 with super- and sub-critical [vapor compression] process are increasingly used in order to satisfy environmental restrictions. Depending on the application, said refrigerants are fundamentally suitable for use in circulations for cooling and heating motor vehicles, however, substance-specific properties must be taken into consideration.

For example, R744, carbon dioxide, is suitable in particular for heating media over a large temperature glide. Herein the media employed as heat carriers are heated, for example, from 10 to 60° C., from 20 to 50° C. or also from 30 to 60° C. For the performance and the efficiency in circulations with carbon dioxide as the refrigerant, the temperature of the carbon dioxide before the expansion is decisive. If this temperature is higher than 40° C., the capacity of the system decreases and the efficiency falls markedly.

The temperature in the refrigerant circulation is critically determined by the gas cooler or the condenser that is disposed in the first row of the cooling package in cooling operation or as additional heater in the air-conditioning device and onto which acts the cold ambient air and cools it. A circulation with R744 as the refrigerant can, with regard to its basic conditions, also be conventionally operated close to an optimal level.

A further important aspect comprises that in different motor vehicle models the gas cooler/condenser of the refrigerant circulation is no longer disposed in the first row of the heat exchanger for cooling in order, for example in electric motor vehicles, to be able to better cool the power electronics or, in some motor vehicles with internal combustion engines, the charge air. As a result, the gas cooler/condenser is moved into the second row of the heat exchanger and the cooling of the refrigerant is no longer optimal. With respect to efficiency and performance, this has a large effect in particular for R744 and is also a negative factor in the case of the refrigerant R1234yf in view of pressure position [in the series of rows] and efficiency and performance.

Prior art takes this fact into consideration thereby that water-cooled condenser/gas coolers are utilized which in parallel flow receive the same cooling water as the power electronics or the charge air. This is of special interest in electric motor vehicles since there is only one heat exchanger that is in contact with the surrounding. The entire residual heat of the various heat sources is collected in the motor vehicle and, when an excess is reached, is output to the surrounding. Otherwise this residual heat can be utilized for heating the interior compartment or as a heat source for the heat pump.

It is furthermore known in prior art that even in electric motor vehicles in some cases heating does not take place with the refrigerant but rather, as before, with a heating heat exchanger that is operated in the water circulation with a water-glycol mixture. The water flows herein through the heating heat exchanger at a high volumetric rate of flow and low temperature difference. After the heating-up phase of the water circulation, the temperature is in an optimal range of 50 to 60° C. For the operation of a heat pump this means that the temperature of the refrigerant, after the water has been heated up, in addition to the temperature difference, is approximately in the stated temperature range. This results in very poor efficiency for the refrigerant R744.

The objective of the invention comprises providing a method for operating an air-conditioning system that enables a high efficiency of the refrigerant circulation. Consequently, it is the task of the invention to improve the circulation such that the efficient operation of the refrigerant circulation, in particular of the heat pump, is possible.

The problem is resolved through a method comprising the characteristics of Patent Claim 1. Further developments are indicated in the dependent patent claims.

The concept of the invention comprises maintaining the temperature of the refrigerant before the expansion at −20 to +30° C. and therewith markedly below the customary temperature range of +30 to 50° C. While the selected temperature range is in principle obtainable with cold air for cooling, however, this is only realizable with difficulty or not at all in prior-art generic air-conditioning systems with water circulation. For example in the case of R744 the temperature range before the evaporation also has a significant effect on the pressure level of the transcritical cyclic process.

A further fundamental recognition of the invention comprises that through the adaptation of the temperature profile of the water circulation to the temperature profile of the refrigerant a marked efficiency improvement is feasible. This is attained thereby that the heating heat exchanger is no longer operated at a high volumetric rate of flow at a low temperature difference but rather at a low volumetric rate of flow at a high temperature difference. This allows for the refrigerant, in particular R744 or also R1234yf, to be cooled to the corresponding temperature. The air-water heat exchanger, thus the heating heat exchanger, as well as the refrigerant-water heat exchanger, the condenser/gas cooler, is preferably laid out and operated in counterflow or cross-counterflow.

In the air-water heat exchanger of the water circulation, the heating heat exchanger, the air can flow over several serially connected heat exchanger segments of the water.

Depending on the refrigerant utilized, in the refrigerant circulation can furthermore be disposed an internal heat exchanger, optionally several compressors, several condensers/gas coolers, check valves, shut-off valves, thermal expansion valves and electric expansion valves, nozzles and series- or parallel-connected evaporators.

To decrease the valves, the water circulation can be hydraulically balanced.

A further preferred implementation comprises for the rotational speed of the water pump and for the refrigerant compressor to perform under regulation.

The invention is in particular realized through a method for operating an air-conditioning system of a motor vehicle, wherein the air-conditioning system comprises a refrigerant circulation and a water circulation.

The refrigerant circulation and the water circulation are thermally coupled across a fluid/fluid heat exchanger, the condenser/gas cooler, wherein heat is transferred on the one side to the water, thus from the refrigerant circulation to the water circulation.

In addition to a pump, the water circulation comprises a heating heat exchanger for heating air for the passenger compartment of the motor vehicle. The refrigerant circulation comprises furthermore the customary components for a vapor compression process, such as the compressor, an expansion element and an evaporator.

The invention is now characterized in particular thereby that the water circulation flows through the condenser/gas cooler at a low volumetric rate of flow and a high temperature difference such that the water circulation transfers heat in the heating heat exchanger to the air in a similar temperature range. The refrigerant circulation is cooled from 65 to 70° to −10 to +30° C. and the water circulation is raised to a temperature of 55 to 65° C., wherein an adaptation of the temperature profile of the water circulation to the temperature profile of the refrigerant circulation in the condenser/gas cooler takes place with the utilization of a temperature glide of the refrigerant. The refrigerant is hereby significantly cooled.

The water circulation is preferably operated at a flow rate of 1 kg per hour up to 540 kg per hour.

It is especially preferred for the refrigerant circulation to be operated with the refrigerant R744, carbon dioxide, or alternatively with the refrigerant R1234yf.

The refrigerant circulation is advantageously operated with a refrigerant mass flow of 10 to 300 kg per hour of the refrigerant R744.

The rotational speed of the pump of the water circulation is herein continuously regulated depending on the ambient temperature and the available capacity of the heat source.

The water circulation is advantageously operated with a water-glycol mixture.

Advantageous embodiments of the invention comprise operating the refrigerant circulation with an internal heat exchanger and optionally several compressors and/or several condensers/gas coolers as well as several evaporators.

The flow through the heating heat exchangers and/or the condenser/gas cooler preferably takes place in counterflow or crossflow.

The heating heat exchanger is advantageously developed such that the air to be heated is conveyed over several heat exchanger segments connected in series. In this multi-row implementation the air to be heated is heated to a high temperature and the refrigerant can, on the other hand, be cooled, preferably in counter- and cross-flow, to a relatively low temperature.

According to an advantageous implementation of the invention, for the performance of the heat pump with respect to heating but also heat source capacity, the high pressure as well as the volumetric flow rate of the water is utilized as the setting parameter.

A prominent advantage of the invention comprises the significant improvement of the efficiency of the circulation, especially in heat pump application. The advantages are especially noted in the use of R744 as the refrigerant, however they can also be realized with R1234yf or refrigerants having similar thermodynamic properties.

Figure 1:
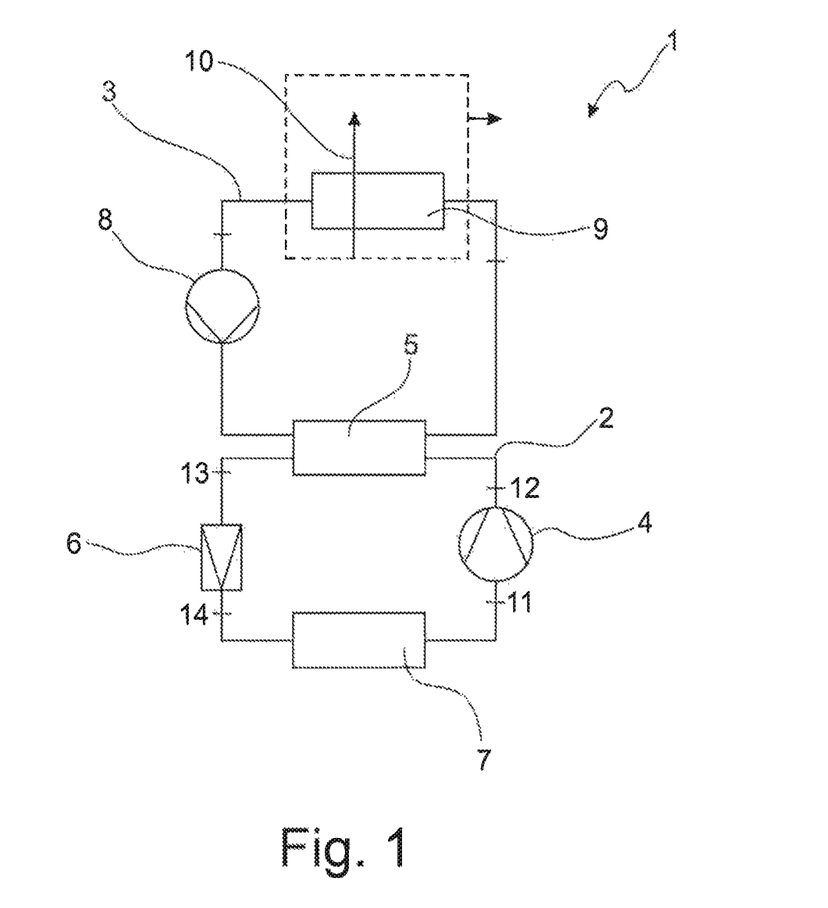
FIG. 1: a simplified diagram of an air-conditioning system according to the invention.

Further details, characteristics and advantages of embodiments of the invention are evident in the following description of embodiment examples with reference to the associated drawing. In the drawing depict:

FIG. 1 shows an air-conditioning system substantially built of two main components, the refrigerant circulation 2 and the water circulation 3.

The refrigerant circulation 2 comprises at least one compressor 4, one condenser/gas cooler 5, one expansion element 6 as well as one evaporator 7 as basic components of the circuit, as is customary and known in prior art. In addition, depending on the refrigerant employed and optionally additional requirements, several compressors 4, expansion elements 6 or also evaporators 7 can in principle be utilized and supplemented, wherein the gas cooler/condenser 5 in terms of function represents the thermal coupling to the water circulation 3.

The water circulation 3 comprises a pump 8 for the circulation of the circuit and the heating heat exchanger 9 which is integrated into the ventilation system of the motor vehicle and via which the heating of the air 10 of the passenger compartment takes place. The thermal coupling of the refrigerant circulation 2 and the water circulation 3 takes place across a heat exchanger which, according to its function in the refrigerant circulation 2, is referred to as condenser/gas cooler 5. The heat from the refrigerant circulation 2 is output via the condenser/gas cooler 5 to the water circulation 3, whereupon the heated water transfers in the heating heat exchanger 9 the heat to the air 10 for heating the passenger compartment of the motor vehicle.

The refrigerant circulation indicates by the measurement point with the reference number 11 the refrigerant suction status before the compression, by the reference number 12 the refrigerant compression final state after the compression of the refrigerant, by the reference number 13 the refrigerant high-pressure state before the expansion and by the reference number 14 the refrigerant low-pressure state after the expansion. As will be explained in the following in further Figures, these points are points of state in the state diagrams for the refrigerant.

Figure 2A:
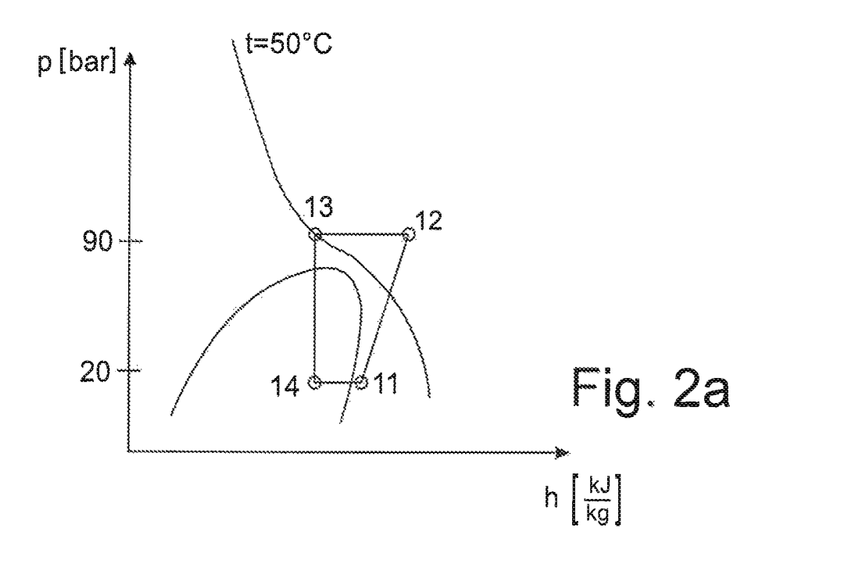
FIG. 2a: log(p)—[enthalpy] h diagram of a conventional refrigeration process with R744 as the refrigerant in transcritical process control.

FIG. 2a depicts a log(p)—h diagram for R744 as the refrigerant and a transcritical method according to prior art and will be described in the following with reference to FIG.

1. The isothermal curve of t=50° C. extends through point 13, the refrigerant high-pressure state before expansion. This means that the refrigerant after the gas cooler 5 has a temperature of 50° C. and is expanded to low pressure from 90 to 20 bars at point 14, the refrigerant low-pressure state after the expansion. In the evaporator 7 and with minimal overheating the refrigerant absorbs energy under evaporation and is lastly from point 11, the refrigerant suction state before the compression, to point 12, the refrigerant compression final state after the compression, compressed to high pressure in compressor 4.

Figure 2B:
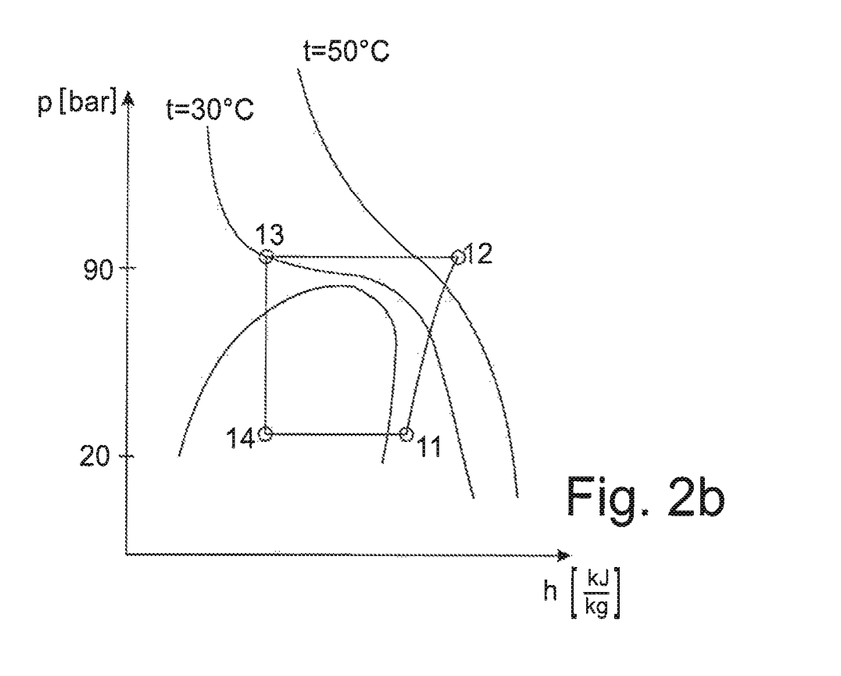
FIG. 2b: log(p)—h diagram according to the method according to the invention with R744 as the refrigerant in transcritical process control.

As a comparison of the process controls, in FIG. 2b is shown schematically a (log(p), h) diagram according to the invention. In order to be able to compare the processes, the pressure level is selected to be the same as in the method from FIG. 2a. Through the modifications in the process control according to the invention, the state points for the temperatures, however, differ from prior art. In particular point 13, the high-pressure state of the refrigerant before expansion, thus the state of the refrigerant after the gas cooler 5, is decreased from the temperature to 30° C. The expansion takes place as before after point 14, the refrigerant low-pressure state after the expansion. Since point 14 in the process is located further to the left in comparison to FIG. 2a, an increase of the enthalpy difference can be noticed from point 14 to point 11 in the state diagram. This means that the usable cooling capacity increases. The compression from point 11 to point 12 takes place analogously to the method according to prior art up to a final compression temperature which, in the example for the refrigerant R744, is up to approximately 120° C.

Figure 3:
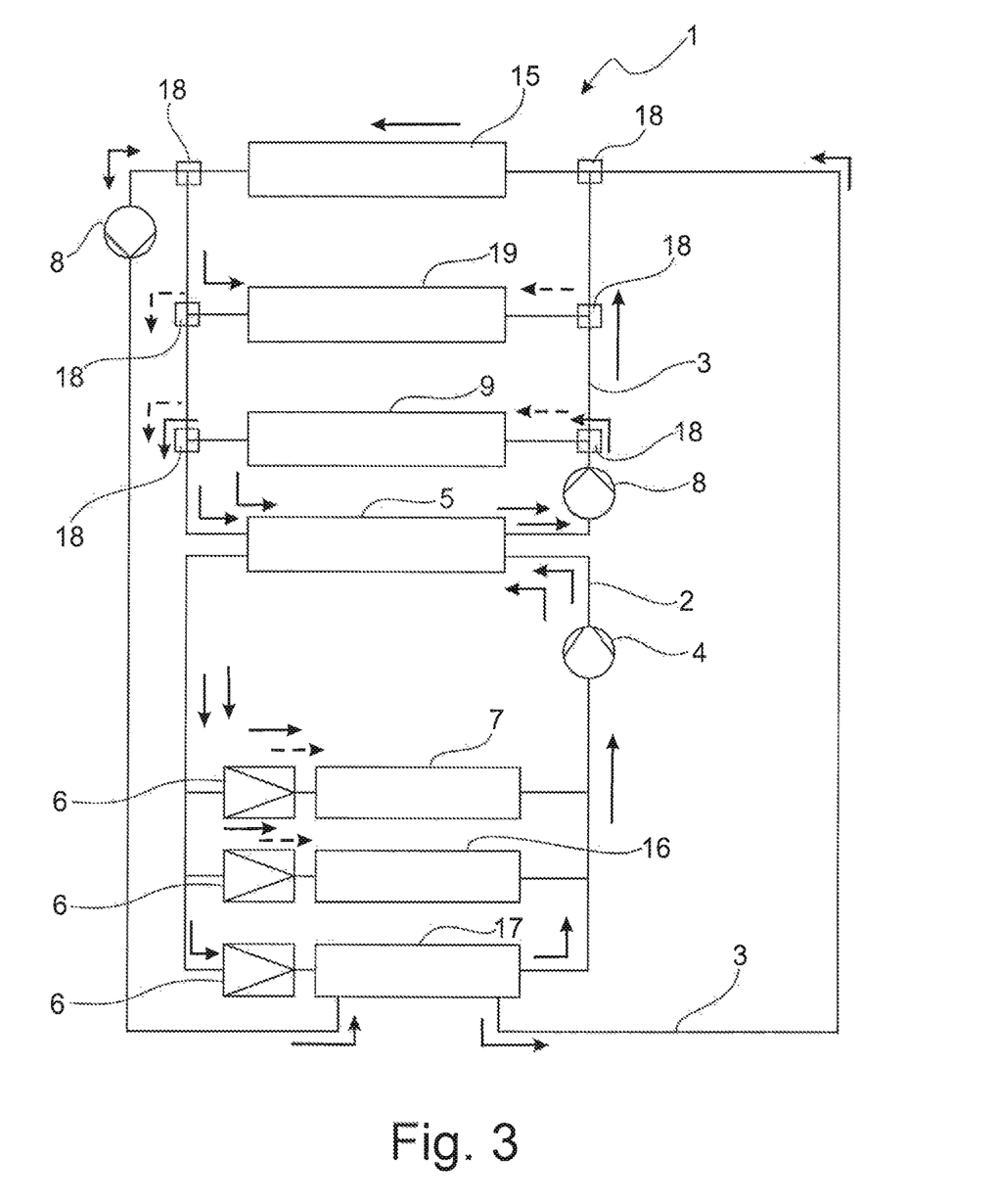
FIG. 3: simplified diagram of a multifunctional air-conditioning system.

In FIG. 3 is shown schematically a somewhat more complex implementation of a circuit, wherein the basic concept is realized in the same manner. The air-conditioning system 1 is again analogously comprised of the refrigerant circulation 2 and the water circulation 3 that are thermally coupled across the condenser/gas cooler 5 of the refrigerant circulation 2. The refrigerant circulation 2 is expanded to the effect that evaporation takes place in parallel on different pressure planes. For this purpose, expansion elements 6 are assigned to evaporators 7, 16, 17 that are referred to as evaporator 7, as battery cooler 16 and as cooler 17. The cooler 17 is integrated into the water circulation 3 by a loop of the latter and, in the depicted embodiment, the air-conditioning system 1 can heat the water circulation 3, depending on the requirements, across the condenser/gas cooler 5 or cool it across the cooler 17. Pumps 8 are provided for this purpose for the water circulation 2 [sic:3]. In addition to the condenser/gas cooler 5, in the water circulation 3 are provided the heating heat exchanger 9 and additionally a heat exchanger as charge-air cooler 19, for example in hybrid motor vehicles. The water circulation 3 is complemented by a low-temperature heat exchanger 15 via which not required waste heat in particular operating states can be discharged to the surrounding. The integration of the various heat exchangers 5, 9, 15, 19 of the water circulation 3 takes place across changeover valves 18.

FIGS. 4a, 4b and 5a, 5b depict qualitative state diagrams of R744 and of R1234yf. Diagrams 4a and 4b show the transcritical process for the refrigerant R744, wherein in the diagrammatic component plan of the cooling system, the heat exchanger for the discharge of the heat from the refrigerant circulation 2 is functionally utilized as gas cooler 5 from the process state 12, the refrigerant final compression state after the compression, to the refrigerant high-pressure state before the expansion 13. In contrast thereto, in FIGS. 5a and 5b the refrigerant R1234yf is depicted qualitatively, in which the heat exchanger for the discharge of heat to the water circulation 3 operates as condenser 5 with reference to the FIGS. 1 and 3.

Figure 4A:
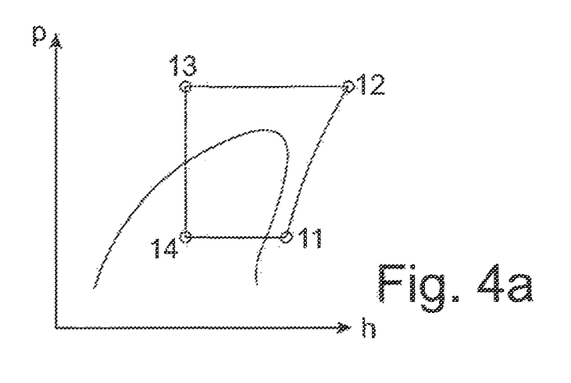
FIG. 4a: log(p)—h diagram for R744.
Figure 4B:
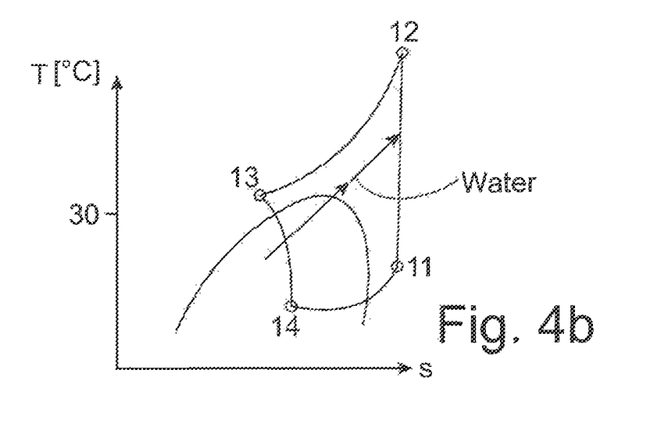
FIG. 4b: T-S diagram for the refrigerant R744.
Figure 5A:
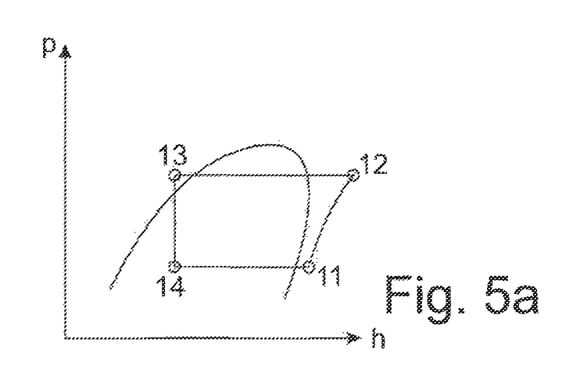
FIG. 5a: log(p)—h diagram for the refrigerant R1234yf.
Figure 5B:
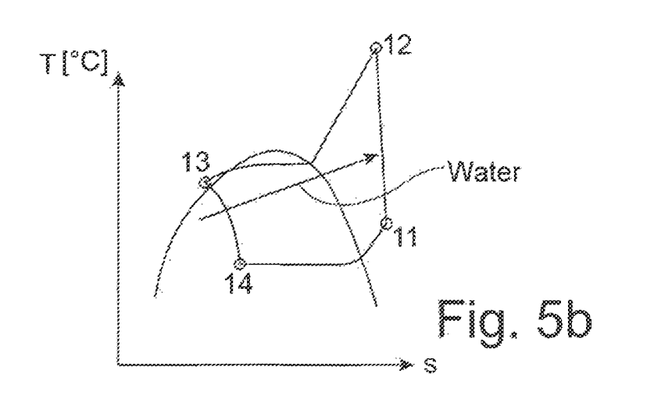
FIG. 5b: T-S diagram for the refrigerant R1234yf.

FIG. 4b depicts a T-S diagram which shows the utilization of the temperature glide for the refrigerant in the heat transfer from the refrigerant to the water circulation in the condenser/gas cooler 5. The condenser/gas cooler 5 is herein connected in counterflow such that the heating of the water in the heat exchanger to temperatures above the refrigerant output temperature takes place. Analogously, in FIG. 5b is shown the utilization of the temperature glide with minor restrictions through the temperature plateau within the two-phase region for the refrigerant R1234yf.

Figure 6:
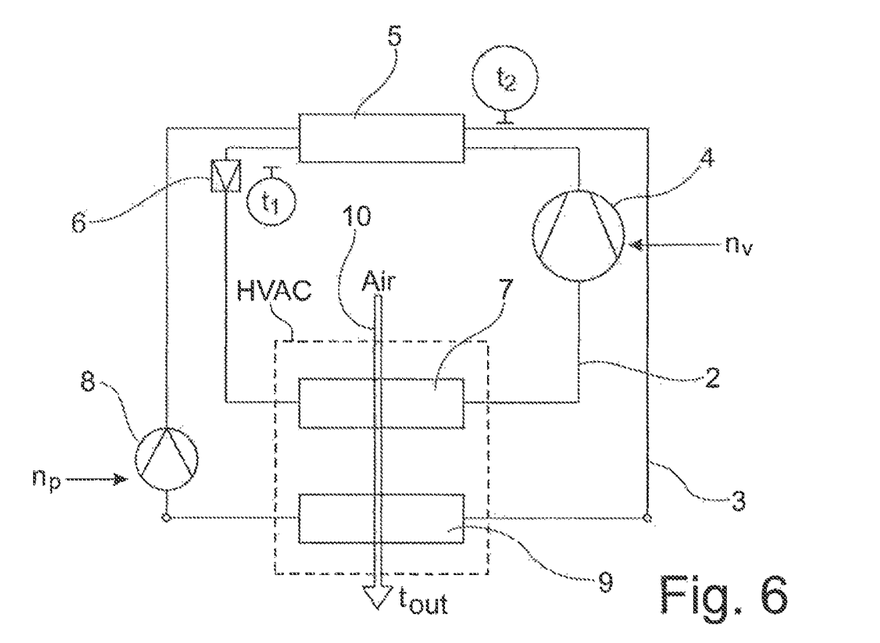
FIG. 6: simplified diagram of an embodiment of an air-conditioning system.

In FIG. 6 is depicted in part a [fluid] circuit diagram wherein are shown the refrigerant circulation 2 and the water circulation 3, wherein, as a parameter for the regulation of the method according to the concept, the compressor 4 is supplemented via the rotational speed $n_V$ of the compressor of the refrigerant circulation and the pump 8 with the rotational speed $n_P$ of the pump of the water circulation. Furthermore are depicted the temperatures $t_1$, the evaporator temperature after the expansion element 6 in the refrigerant circulation 2, and the coolant water temperature after the heating, denoted by $t_2$, within the water circulation 3 after the condenser/gas cooler 5. The air 10 is herein first cooled in evaporator 7, for example for the purpose of dehumidification, and subsequently its temperature is raised across the heating heat exchanger 9 to the temperature of the ambient air in the passenger compartment.

Figure 7:
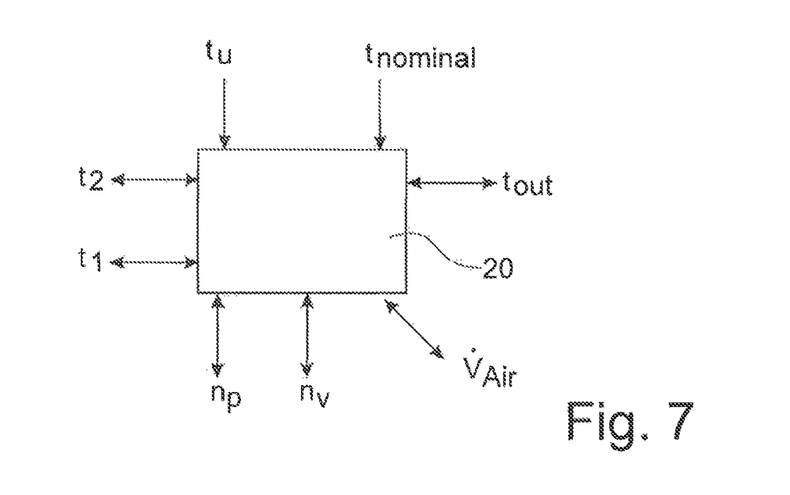
FIG. 7: control and regulation arrangement for an air-conditioning system.

FIG. 7 depicts a control and regulation arrangement 20 which implements the regulation strategy in the air-conditioning system, wherein, as the input variables the ambient temperature $t_U$ as well as the specified target temperature $t_{nominal}$ are regulated through a balance via the evaporation temperature $t_1$, the coolant water temperature $t_2$ and the regulation of the air temperature in the passenger compartment $t_{out}$ with the regulation of the volumetric air flow rate $V^{dot}_{air}$ as well as the rotational speed compressor refrigerant circulation $n_V$ and the rotational speed pump water circulation $n_P$.

Depending on the ambient temperature and the required set temperature of the passengers, a heating capacity results as well as the minimum starting temperature of the water to be reached. At the start of travelling in the extreme case, by assumption, no residual heat will be available in the motor vehicle. Thus, during heat pump operation an appropriate heating capacity must be absorbed at a low temperature level. With the aid of the high pressure of the refrigerant circulation and of the volumetric rate of flow of the water, the heating of the passenger compartment as well as also the capacity of the heat source to be additionally taken up, can be set. The heat source is most frequently limited thereby that the heat exchanger may freeze up. It is significant that the previously known water circulation always had a constant temperature of 55 to 60° C. between forward and return flow. This is a significant difference from the operating mode according to the invention.

LIST OF REFERENCE NUMBERS

1 Air-Conditioning system
2 Refrigerant circulation
3 Water circulation
4 Compressor
5 Condenser/gas cooler
6 Expansion element
7 Evaporator 8 Pump
9 Heating heat exchanger
10 Air
11 Refrigerant suction state before compression
12 Refrigerant compression end state after compression
13 Refrigerant high-pressure state before expansion
14 Refrigerant low-pressure state after expansion
15 Low temperature heat exchanger
16 Battery cooler
17 Cooler
18 Changeover valves
19 Charge-Air cooler
20 Control and regulation arrangement
$t_U$ Ambient temperature
$t_{nominal}$ Target temperature
$t_1$ Evaporation temperature
$t_2$ Coolant water temperature
$t_{out}$ Air temperature passenger compartment
$n_V$ Rotational speed compressor refrigerant circulation
$n_P$ Rotational speed pump water circulation

The invention claimed is:

1. A method for operating an air-conditioning system of a motor vehicle, wherein the air-conditioning system comprises a refrigerant circulation and a water circulation which are thermally coupled with one another across a condenser/gas cooler and the water circulation comprises, in addition to a pump, a heating heat exchanger for heating the air for the passenger compartment of a motor vehicle and the refrigerant circulation comprises a compressor, an expansion element and an evaporator, comprising the steps of
   flowing the water circulation through the condenser/gas cooler at a volumetric rate of flow and a temperature difference such that the water circulation transfers heat in the heating heat exchanger to the air in a temperature range,
   cooling the refrigerant circulation from 65° C. to 70° C. to −10° C. to +30° C., and
   raising the water circulation to a temperature of 55° C. to 65° C., and
   adapting the temperature of the water circulation to the temperature of the refrigerant circulation, wherein the adapting is executed by a controller to cool the refrigerant in the condenser/gas cooler utilizing a temperature glide of the refrigerant,
   wherein the controller controls a volumetric air flow rate $V^{dot}_{air}$ a rotational speed $n_V$ of the compressor and a rotational speed $n_P$ of the pump based on an ambient temperature $t_U$, a specified target temperature $t_{nominal}$, an evaporation temperature $t_1$ after the expansion element in the refrigerant circulation, a coolant water temperature $t_2$ after the condenser/gas cooler in the water circulation and an air temperature $t_{out}$ in the passenger compartment;
   wherein the evaporation temperature $t_1$ is measured after the expansion element in the refrigerant circulation system, and
   wherein the cooling water temperature $t_2$ is measured after the condenser or gas cooler in the water circulation system.

2. A method according to claim 1, wherein at the heating heat exchanger air is conveyed over several serially connected heat exchanger segments.

3. A method according to claim 1, wherein the pressure as well as the volumetric rate of flow of the water is utilized as a setting parameter for the capacity of the heat pumps with respect to heating as well as also heat source capacity.

4. A method according to claim 1, wherein the refrigerant circulation is operated with an internal heat exchanger, several compressors or several condensers/gas coolers, or a combination thereof.

5. A method according to claim 4, wherein the flow through the heating heat exchanger and/or the several condensers/gas coolers takes place in counter-flow or cross-flow.

6. A method according to claim 1, wherein the water circulation is operated with a mixture of water and glycol.

7. A method according to claim 6, wherein the refrigerant circulation is operated with an internal heat exchanger.

8. A method according to claim 1, wherein the refrigerant circulation is operated with a refrigerant mass flow of 10 to 300 kg/hr with the refrigerant R744.

9. A method according to claim 8, wherein the refrigerant circulation is operated with several compressors.

10. A method according to claim 8, wherein the water circulation is operated with a mixture of water and glycol.

11. A method according to claim 1, wherein the refrigerant circulation is operated with the refrigerant R744 in super- as well as also sub-critical.

12. A method according to claim 11, wherein the refrigerant circulation is operated with several condensers/gas coolers.

13. A method according to claim 11, wherein the water circulation is operated with a mixture of water and glycol.

14. A method according to claim 1, wherein the water circulation is operated at a flow rate of 1 kg/hr to 540 kg/hr.

15. A method according to claim 14, wherein the refrigerant circulation is operated with the refrigerant R1234yf in super- as well as also sub-critical state.

16. A method according to claim 14, wherein the refrigerant circulation is operated with an internal heat exchanger.

17. A method according to claim 14, wherein the water circulation is operated with a mixture of water and glycol.

18. A method according to claim 14, wherein the flow through the heating heat exchanger and/or the condenser/gas cooler takes place in counter-flow or cross-flow.

* * * * *